United States Patent Office 3,714,299
Patented Jan. 30, 1973

3,714,299
PHOSPHORYLATED ANILIDES
John F. Olin, Ballwin, Mo., assignor to
Monsanto Company, St. Louis, Mo.
No Drawing. Filed Feb. 20, 1970, Ser. No. 13,173
Int. Cl. C07f 9/08; A01n 9/36
U.S. Cl. 260—926                                                15 Claims

ABSTRACT OF THE DISCLOSURE

Insecticidal compounds of the formula

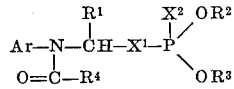

wherein Ar, $R^1$, $R^2$, $R^3$, $R^4$, $X^1$ and $X^2$ are as defined hereinafter.

---

The present invention relates to new and useful anilides and to methods of controlling insects with said anilides. This invention also relates to insecticidal compositions containing the novel anilides as an active agent.

The novel anilides of this invention are represented by the formula

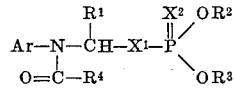

wherein
Ar is

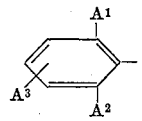

or

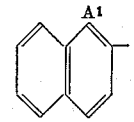

wherein
$A^1$ is alkyl of not more than 8 carbon atoms; $A^2$ and $A^3$ are hydrogen, alkyl of not more than 8 carbon atoms, chlorine or bromine,
$X^1$ and $X^2$ are oxygen or sulfur;
$R^1$ is hydrogen, tertiary alkyl of at least 4 and not more than 8 carbon atoms, or

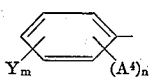

wherein
$A^4$ is alkyl of not more than four carbon atoms, Y is chlorine, bromine or iodine, $m$ is an integer from 0 through 5, and $n$ is an integer from 0 through 2.
$R^2$ and $R^3$ are alkyl of not more than 4 carbon atoms, and
$R^4$ is alkyl, alkoxy, alkoxyalkyl or alkenyl of not more than 12 carbon atoms, haloalkyl of not more than 4 carbon atoms, cycloalkyl of not more than 6 carbon atoms,

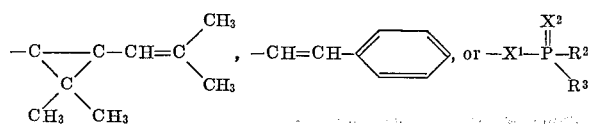

Representative compounds of the present invention include those in which the groups of the above formulas have the following identities:

$A^1$—methyl, ethyl, N-propyl, isopropyl, n-butyl, primary isobutyl, secondary isobutyl, tertiary butyl, the normal and branched amyls, hexyls, heptyls and octyls.

$A^2$ and $A^3$—hydrogen, and the alkyl groups of $A^1$.

$R^1$—hydrogen, tertiary butyl and the tertiary amyls, hexyls, heptyls, and octyls.

$R^2$ and $R^3$—methyl, ethyl, propyl, isopropyl, n-butyl, primary isobutyl, secondary isobutyl, and tertiary butyl.

$R^4$—the alkyl groups of $R^2$ and $R^3$, methoxy, ethoxy, propoxy, pentoxy, hepoxy, heptoxy, nonoxy, decoxy, dodecoxy, vinyl, allyl, crotyl, methylyl, ethynyl, 1-propanynyl, 2-propanynyl, 1-pentynyl, 3-hexynyl, the octynyls, decynyls, and dodecynyls, the alkyls of $R^2$ and $R^3$ substituted with a halogen, 2-methoxy ethyl, 2-ethoxyethyl, 3-methoxypropyl, 3-ethoxypropyl, 3-isopropoxypropyl, 4-methoxybutyl, cyclopropyl, cyclobutyl, cyclopentyl, and cyclohexyl.

The novel phosporylated anilides of this invention are prepared by reacting a salt (e.g. ammonium, trialkyl ammonium, or alkali metal such as sodium, potassium or lithium) of a phosphoric acid of the formula

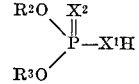

with a substantially equimolecular amount of an N-(chloro- or bromoalkyl-) anilide of the formula

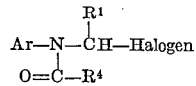

in the presence of an inert organic liquid or solvent (e.g. benzene, toluene, xylene, acetone, methyl ethyl ketone, etc.) at a temperature above the freezing point of the system up to and including the boiling point of the system, preferably at a temperature in the range of 0° C. to 120° C.

The N-haloalkyl anilide can be conveniently prepared by reacting a suitable N-substituted ortho-substituted aromatic amine with an acyl halide in general accordance with the equation:

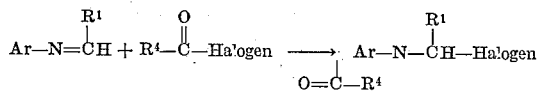

wherein Ar, $R^1$ and $R^4$ are as defined above. This reaction, which is described in copending application Ser. No. 625,020, filed Dec. 22, 1967, is most conveniently carried out in an inert solvent at a temperature between about 0° C. and 150° C.

The invention will be more clearly understood from the following detailed description of specific examples thereof.

EXAMPLE 1

This example describes the preparation of 6'-t-butyl-N-(mercaptomethyl)-O-cinnamotoluidide, S(O,O-diethyl-phosphorodithioate). About 0.1 mole (16.7 grams) cinnamoylchloride, about 100 grams toluene and about 0.1 mole (17.5 grams) 2-t-butyl-6-methyl-N-methyleneaniline were introduced into a suitable reaction vessel and refluxed at a temperature of about 144° C. for one hour with stirring, and then cooled to about 45° C. A solution of the triethylammonium salt of 1 mole (18.6 grams) of O,O-diethylphosphorodithioic acid in 100 grams of benzene was then added to the reaction vessel. The mixture was then refluxed at a temperature of about 93° C. for approximately 15 minutes and allowed to cool to about 50° C. The reaction mixture was filtered, the precipitate washed with benzene, and the filtrate evaporated to dryness, thus obtaining a thick amber liquid which became turbid upon cooling. The reaction product was then dissolved in a mixture of 4 parts of isooctane and 1 part benzene, filtered while warm and again evaporated to obtain a resinous solid. An elemental analysis of this product yielded the following results:

Calc'd for $C_{25}H_{34}NO_3PS_2$ (percent): C, 61.07; H, 7.97; P, 6.30; S, 13.04. Found (percent): C, 61.76; H, 7.25; P, 6.14; S, 12.88.

EXAMPLE 2

This example describes the preparation of 2',6'-diethyl-N-(mercaptomethyl)-2-methoxyacetanilide, S-(O,O-diethyl phosphorodithioate). About 0.1 mole (18.6 gram) of O,O-diethyldithiophosphoric acid was introduced into a suitable reaction vessel with about 100 cc. of benzene. The mixture was evaporated while 0.1 mole (10.2 grams) of triethylamine was added over a 15 minute period. When the reaction was substantially completed in the formation of the phosphoric acid salt, the temperature was adjusted to about 30° C. and 0.1 mole (27 grams) of N-chloromethyl 2',6'-diethyl-2-methoxyacetanilide was added and the mixture refluxed for about a half hour. The mixture was then cooled, the precipitate filtered off, washed with benzene, and air dried. The filtrate was evacuated under vacuum, giving a coffee colored syrupy oil. The oil was taken up in substantially anhydrous ether, filtered, and again evaporated to provide a clear, dark, amber oil having the following analysis:

Calc'd for $C_{18}H_{30}NO_4PS_2$ (percent): P, 7.60; S, 15.25. Found (percent): P, 7.65; S, 15.20.

EXAMPLES 3 THROUGH 13

The following compounds were also prepared by substantial repetition of the general procedures set forth in the foregoing examples:

(3) 2-bromo-6'-tert-butyl-N-(mercaptomethyl)-o-acetotoluidide, S-(O,O-diethyl phosphorodithioate)
(4) 2',6'-diethyl-N-(mercaptomethyl)lauranilide, S-(O,O-diethyl phosphorodithioate)
(5) 2',6'-diethyl-N-(mercaptomethyl)cyclopropanecarboxanilide, S-(O,O-diethyl phosphorodithioate)
(6) 2',6'-diethyl-N-(mercaptomethyl)-2,2,2-trichloroacetanilide, S-(O,O-diethyl phosphorodithioate)
(7) 2',6'-diethyl-2-mercapto-N-(mercaptomethyl)acetanilide, S,S'-bis-(O,O-diethyl phosphorodithioate)
(8) 2',6'-diethyl-N-(mercaptomethyl)chrysanthemummonocarboxanilide, S-(O,O-diethyl phosphorodithioate)
(9) N-(2-tert-butyl-1-naphthyl)-N-(mercaptomethyl)chrysanthememonocarboxanilide, S-(O,O-diethyl phosphorodithioate)
(10) 2'-tert-butyl-6'-ethyl-N-(mercaptomethyl)chrysanthemummonocarboxanilide, S-(O,O-diethyl phosphorodithioate)
(11) 6'-tert-butyl-N-(mercaptomethyl)-2',4'-chrysanthemummonocarboxoxylidide, S-(O,O-diethyl phosphorodithioate)
(12) 6'-tert-butyl-N-(mercaptomethyl)-2',3'-chrysanthemummonocarboxoxylidide, S-(O,O-diethyl phosphorodithioate)
(13) 4',6'-di-tert-butyl-N-(mercaptomethyl)-o-chrysanthemummonocarboxotoluidide, S-(O,O-diethyl phosphorodithioate)

The terms "insect" and "insecticide" are used herein in their broad common usage to include spiders, mites, ticks, and like pests which are not in the strict biological sense classed as insects. Thus, the term "insect" is used to refer not only to those small invertebrate animals belonging mostly to the class Insecta, comprising six-legged, usually winged forms, as beetles, bugs, bees, flies, and so forth, but also to other allied classes of arthropods whose members are wingless and usually have more than six legs, as spiders, mites, ticks, centipedes, and wood lice.

The invention and the manner in which it achieves its objectives will be more readily understood by reference to the following examples in which compounds of the present invention were tested against a number of insect pests.

In order to demonstrate the activity of the compounds of this invention against the yellow fever mosquito (*Aedes egyptii*) early fourth instar mosquitoes were placed in diluted aqueous acetone solutions of the insecticides held at about 80° F. for 24 hours, and the following mortality observations made:

| Compound of Example | Concentration (p.p.m.) | Mortality, percent |
|---|---|---|
| 2 | 2.0 | 90 |
| 3 | 2.0 | 50 |
| 5 | 0.2 | 90 |
| 6 | 2.0 | 80 |

The utility of the compounds of this invention in controlling sheep blow fly larvae (*Lucilia cuprina*) was illustrated by preparing a homogenized food medium of about 100 grams of minced beef, 200 ml. of water, and 3.5 grams of alginate. The compounds of this invention were added to individual portions of the food medium, which was then infested with the larvae and maintained for 24 hours at 25° C. and 70% R.H. With the compound of Example 2 and also with the compound of Example 5, 100% kills were obtained when the insecticides were used at a concentration of 16 p.p.m.

The control of the Mexican Bean Beetle is readily achieved with the compounds of the present invention. To illustrate this, Lima bean leaves were dipped in aqueous acetone solutions of the compounds and dried. The treated leaves were then offered to Mexican Bean Beetles (late second instar) for a 48 hour feeding period and the following mortality rates were observed:

| Compound of Example | Percent Concentration | Mortality |
|---|---|---|
| 2 | 0.005 | 90 |
| 3 | 0.10 | 60 |
| 5 | 0.005 | 70 |
| 6 | 0.01 | 100 |
| 7 | 0.01 | 70 |
| 10 | 0.02 | 50 |

The effect of the compound against pea aphids was shown by spraying the pea aphids with solutions of the present compounds and transferring the aphids to pea plants which had been sprayed with the same insecticidal solution. After a 48 hour period, the mortality rate was observed with the following results:

| Compound of Example | Percent Concentration | Mortality |
|---|---|---|
| 2 | 0.01 | 40 |
| 5 | 0.01 | 70 |
| 6 | 0.02 | 50 |

The effectiveness of compounds of this invention in controlling mites is illustrated by infesting excised Lima bean plants with adults of the strawberry spider mite prior to testing. The infested plants are dipped into solutions of compounds of this invention and the mortality rate recorded after a five day period. The compound of Example 2, as well as the compound of Example 5, when used at a concentration of 16 p.p.m. resulted in 100% kill of the mites.

The compounds of this invention are also effective in combatting cattle ticks (*Boophilus microplus*). In a standard test in which the larvae are maintained in a paper pouch impregnated with the active ingredient, a 100% kill of cattle tick larvae was obtained with the compound of Example 2 at a concentration of 0.56% and a 100% kill was also obtained using the compound of Example 5, at a concentration of 1.12%.

Although the compounds of this invention are useful per se in controlling a wide variety of insect pests, it is preferable that they be supplied to the pests or to the environment of the pests in a dispersed form in a suitable extending agent.

The term "dispersed" is used herein in its widest possible sense. Particles of the anilides may be molecular in size and held in true solution in a suitable organic solvent, or the particles may be colloidal in size and distributed throughout a liquid phase in the form of suspensions or emulsions, or in the form of particles held in suspension by wetting agents. The term includes particles which are distributed in a semi-solid viscous carrier such as petroleum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g., pellets, granules, powders, or dusts. The term "dispersed" also includes mixtures which are suitable for use as aerosols including solutions, suspensions, or emulsions of the compounds of this invention in a carrier such as dichloro-difluoromethane and the like which boil below room temperature at atmospheric pressure.

The expression "extending agent" as used herein includes insecticidal adjuvants and any and all of the substances in which the compounds of this invention are dispersed. It includes, therefore, the solvents of a true solution, the liquid phase of suspensions, emulsions or aerosols, the semi-solid carrier of ointments and the solid phase of particulate solids, e.g., pellets, granules, dusts and powders.

The exact concentration of the compounds of this invention employed in combatting or controlling insect pests can vary considerably provided the required dosage (i.e., toxic or lethal amount) thereof is supplied to the pests or to the environment of the pests. When the extending agent is a liquid or mixture of liquids (e.g., as in solutions, suspensions, emulsions, or aerosols) the concentration of the active compound employed to supply the desired dosage generally will be in the range of 0.0001 to 50 percent by weight. When the extending agent is a semi-solid or solid, the concentration of the anilide employed to supply the desired dosage generally will be in the range of 0.1 to 25 percent by weight. From a practical point of view, the manufacturer must supply the user with a concentrate in such form that, by merely mixing with water or solid extender (e.g. powdered clay or talc) or other low-cost material available to the user at the point of use, he will have an easily prepared insecticidal spray or particulate solid. In such a concentrate composition, the anilide generally will be present in a concentration of 5 to 95 percent by weight, the residue being any one or more of the well-known insecticidal adjuvants, such as the various surface active agents (e.g. detergents, a soap or other emulsifying or wetting agent), surface active clays, solvents, diluents, carrier media, adhesives, spreading agents, humectants, and the like.

There are a large number of organic liquids which can be used alone or in combination for the preparation of solutions, suspensions or emulsions of the compounds of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F. at atmospheric pressure and having a flash point above about 80° F., particularly kerosene), mineral oils having an unsulfonatable residue above about 80 percent and preferably above about 90 percent. In those instances wherein there may be concern about the phytotoxicity of the organic liquid extending agent a portion thereof can be replaced by such low molecular weight aliphatic hydrocarbons as dipentene, isobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like.

The anilides of this invention are preferably supplied to the insect pests or to the environment of the insect pests in the form of emulsions or suspensions. Emulsions or suspensions are prepared by dispersing the anilides either per se or in the form of an organic solution thereof in water with the aid of a water-soluble surfactant. The term "surfactant" as employed herein is used as in volume II of Schwartz, Perry and Berch's "Surface Active Agents and Detergents" (1958 Interscience Publishers Inc., New York) in place of the expression "emulsifying agent" to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," Second edition, page 280). These surfactants include the well-known capillary-active substances which may be anionic, cationic, or non-ionic which are described in detail in volumes I and II of Schwartz, Perry and Berch's "Surface Active Agents and Detergents" (1958, Interscience Publishers, Inc., New York) and also in the November 1947 issue of Chemical Industries (pages 811-824) in an article entitled "Synthetic Detergents" by John W. McCutcheon and also in the July, August, September and October 1952 issues of Soap and Sanitary Chemicals under the title "Synthetic Detergents." The disclosures of these articles with respect to surfactants are incorporated in this specification by reference in order to avoid unnecessary enlargement of this specification. The preferred surfactants are the water-soluble anionic nonionic surface-active agents set forth in U.S. 2,846,398 (issued Aug. 5, 1958). In general, a mixture of water-soluble anionic and water-soluble non-ionic surfactants is preferred.

The compounds of this invention can be dispersed by suitable methods (e.g. tumbling or grinding) in solid extending agents either of organic or inorganic nature and supplied to the insect pests' environment in particulate form. Such solid materials include for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials as well as organic materials such as powdered cork, powdered wood, and powdered walnut shells. The preferred solid carriers are the adsorbent clays, e.g. bentonite. These mixtures can be fused for insecticidal purposes in the dry form, or by addition of water-soluble surfactants or wetting agents the dry particulate solids can be rendered wettable by water so as to obtain stable aqueous dispersions or suspensions suitable for use as sprays.

For special purposes the compounds of this invention can be dispersed in a semi-solid extending agent such as petroleum or soap (e.g. sodium stearate or oleate or palmitate or mixtures thereof) with or without the aid of solubility promoters and/or surfactants or dispersing agents.

In all of the forms described above the dispersions can be provided ready for use in combatting insect pests or they can be provided in a concentrated form suitable for mixing with or dispersing in other extending agents. As illustrative of a particularly useful concentrate is an intimate mixture of a compound of this invention with a water-soluble surfactant in the weight proportions of 0.1 to 15 parts of surfactant with sufficient phosphonate to make 100 parts by weight. Such a concentrate is particularly adapted to be made into a spray for combatting various forms of insect pests by the addition of water thereto.

Another useful concentrate adapted to be made into a spray for combatting a variety of insect pests is a solution (preferably as concentrated as possible) of a compound of this invention in an organic solvent therefor. The said liquid concentrate preferably contains dissolved therein a minor amount (e.g. 0.5 to 10 percent by weight of the weight of the new insecticidal agent) of a water-soluble surfactant (or emulsifying agent).

Of the surfactants aforementioned in preparing the various emulsifiable, wettable or dispersible compositions or concentrates of this invention, the anionic and non-ionic surfactants are preferred. Of the anionic surfactants, the particularly preferred are the well known water-soluble alkali metal alkylaryl sulfonates as exemplified by sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of hexitol anhydrides (e.g. sorbitan). These materials in general contain 15 to 30 moles of ethylene oxide per mole of the hexitol anhydride or the alkylphenol.

The compositions of this invention can also contain other additaments such as fertilizers and pesticides used as, or in combination with, the carrier materials. For example, insecticides useful in combination with the above described compounds include parathion, methyl parathion, pyrethrin, nicotine, aldrin, chlordane, heptachlor, toxaphene, malathion, 2-isopropoxyphenyl N-methylcarbamate, O,O,O,O-tetramethyl O,O'-thiodi-p-phenylene phosphorothioate, dimethyl phosphate of 3-hydroxy-N-methyl-cis-crotonamide, fenthion, carbofuran, mirex, DDT, dicofol, methoxychlor, dichlorvos, demeton, dimethoate, carbophenothion ronnel, carbaryl, azinphosmethyl, methonyl, aldicarb and the like.

In controlling or combatting insect pests the compounds of this invention either per se or compositions containing them are supplied to the insect pests or to their environment in a lethal or toxic amount. This can be done by dispersing the new insecticidal agent or insecticidal composition comprising same in, on or over an infested environment or in, on or over an environment the insect pests frequent, e.g. agricultural soil or other growth media or other media infested with insect pests or attractable to the pests for habitational or sustenance or propagational purposes, in any conventional fashion which permits contact between the insert pests and the phosphonodithioates of this invention. Such dispersing can be brought about by applying sprays, dips or particulate solid compositions to a surface infested with the insect pests or attractable to the pests as for example, animals such as sheep and cattle, the surface of an agricultural soil or other media such as the above ground surface of plants by any of the conventional methods, e.g. power dusters, boom and hand sprayers, and spray dusters. Also for sub-surface application such dispersing can be carried out by simply mixing the new insecticidal agent per se or insecticidal spray or particulate solid compositions comprising same with the infested environment or with the environment the insect pests frequent, or by employing a liquid carrier for the new insecticidal agent to accomplish subsurface penetration and impregnation therein.

While this invention has been described with respect to certain embodiments, it is to be understood that it is not so limited and that variations and modifications thereof obvious to those skilled in the art can be made without departing from the spirit and scope thereof.

What is claimed is:

1. A compound of the formula

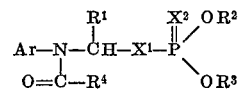

wherein

Ar is

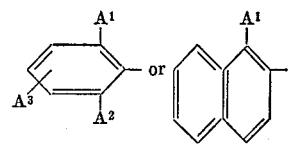

wherein

A$^1$ is alkyl of not more than 8 carbon atoms, A$^2$ and A$^3$ are hydrogen, alkyl of not more than 8 carbon atoms, chlorine or bromine, X$^1$ and X$^2$ are oxygen or sulfur, R$^1$ is hydrogen, tertiary alkyl of not more than 8 carbon atoms or

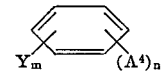

wherein

A$^4$ is alkyl of not more than 4 carbon atoms, Y is chlorine, bromine or iodine, $m$ is an integer from 0 through 5 and $n$ is an integer from 0 through 2, R$^2$ and R$^3$ are alkyl of not more than 4 carbon atoms, and R$^4$ is alkyl, alkoxy, alkoxyalkyl, or alkenyl of not more than 12 carbon atoms, haloalkyl of not more than 4 carbon atoms, cycloalkyl of not more than 6 carbon atoms,

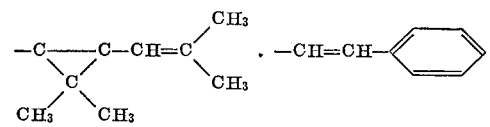

or

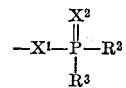

2. A compound in accordance with claim 1 in which Ar

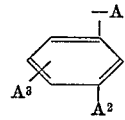

3. A compound in accordance with claim 2 in which A$^2$ is alkyl of not more than 8 carbon atoms, and A$^3$ is hydrogen.

4. A compound in accordance with claim 2 in which R$^1$ is hydrogen, R$^4$ is alkoxyalkyl of not more than 12 carbon atoms, and X$^1$ and X$^2$ are sulfur.

5. A compound in accordance with claim 2 in which R$^1$ is hydrogen, R$^4$ is alkyl of not more than 12 carbon atoms and X$^1$ and X$^2$ are sulfur.

6. A compound in accordance with claim 2 which is 2',6' - diethyl-2-mercapto-N-mercaptomethyl)acetanilide, S,S'-bis(O,O-diethyl phosphorodithioate).

7. A compound in accordance with claim 2 which is 2'-6' - diethyl-N-(mercaptomethyl)cyclopropanecarboxanilide, S-(O,O-diethyl phosphorodithioate).

8. A compound in accordance with claim 2 which is 2',6' - diethyl-N-(mercaptomethyl)-2,2,2-trichloroacetanilide, S-(O,O-diethyl phosphorodithioate).

9. A compound in accordance with claim 2 which is 2',6' - diethyl-N-(mercaptomethyl)-2-methoxyacetanilide, S-(O,O-diethyl phosphorodithioate).

10. A compound in accordance with claim 2 which is 2 - bromo-6'-tert-butyl-N-(mercaptomethyl)-o-acetotoluidide, S-(O,O-diethyl phosphorodithioate).

11. A compound in accordance with claim 1 in which Ar is

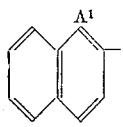

12. A compound in accordance with claim 11 in which $A^1$ is tert-butyl.

13. A compound in accordance with claim 11 in which $R^1$ is hydrogen, $R^4$ is alkyl of not more than 12 carbon atoms and $X^1$ and $X^2$ are sulfur.

14. A compound in accordance with claim 11 in which $R^1$ is hydrogen, $R^4$ is alkoxyalkyl of not more than 12 carbon atoms and $X^1$ and $X^2$ are sulfur.

15. A compound in accordance with claim 11 which is N - (2 - tert-butyl-1-naphthyl)-N-(mercaptomethyl)chrysanthemummonocarboxamide, S-(O,O-diethyl phosphorodithioate).

References Cited

UNITED STATES PATENTS 2,566,129   8/1951   Hook et al. _____ 260—944

FOREIGN PATENTS 1,150,378   6/1963   Germany _____ 260—944

LEWIS GOTTS, Primary Examiner

A. H. SUTTO, Assistant Examiner

U.S. Cl. X.R.

260—403, 404, 561 P, 938, 944, 979; 424—211, 306